(12) United States Patent
Blakes

(10) Patent No.: US 7,646,571 B2
(45) Date of Patent: Jan. 12, 2010

(54) CIRCUIT FOR EFFECTIVE QUENCH HEATING IN SUPERCONDUCTING MAGNETS

(75) Inventor: Hugh Alexander Blakes, Bicester (GB)

(73) Assignee: Siemens Plc, Frimley, Camberley (GB)

( * ) Notice: Subject to any disclaimer, the term of this patent is extended or adjusted under 35 U.S.C. 154(b) by 86 days.

(21) Appl. No.: 11/597,755

(22) PCT Filed: May 31, 2005

(86) PCT No.: PCT/GB2005/002165

§ 371 (c)(1),
(2), (4) Date: Feb. 15, 2008

(87) PCT Pub. No.: WO2005/119872

PCT Pub. Date: Dec. 15, 2005

(65) Prior Publication Data

US 2008/0232004 A1    Sep. 25, 2008

(30) Foreign Application Priority Data

May 29, 2004  (GB) .................... 0412091.1
Dec. 23, 2004 (GB) .................... 0428176.2
Apr. 6, 2005  (GB) .................... 0506944.8

(51) Int. Cl.
*H02H 7/00* (2006.01)
*H02H 9/00* (2006.01)
(52) U.S. Cl. ........................................................ 361/19
(58) Field of Classification Search .................... 361/19
See application file for complete search history.

(56) References Cited

U.S. PATENT DOCUMENTS

| 5,278,380 | A | * | 1/1994 | Lowry | ......................... 219/635 |
| 6,147,844 | A | * | 11/2000 | Huang et al. | .................. 361/19 |
| 6,646,836 | B2 | * | 11/2003 | Yoshikawa | .................... 361/19 |
| 7,116,535 | B2 | * | 10/2006 | Huang | .......................... 361/19 |

\* cited by examiner

*Primary Examiner*—Albert W Paladini
*Assistant Examiner*—Dharti Patel
(74) *Attorney, Agent, or Firm*—Crowell & Moring LLP

(57) ABSTRACT

An assembly comprising a number of superconductive coils, at least one quench heater arranged to heat the superconductive coil(s) in the event that at least part of at least one of the coils enters a quenched state; means for transferring energy from the coil(s) to the heater(s) in the event that at least part of at least one of the coils enters a quenched state; wherein the means for transferring energy from the coil(s) to the heater(s) includes a series capacitance, through which the energy transferred must pass.

4 Claims, 2 Drawing Sheets

CIRCUIT FOR EFFECTIVE QUENCH HEATING IN SUPERCONDUCTING MAGNETS

The present invention relates to superconducting coils. More particularly it relates to apparatus for preventing damage to superconducting coils in the case of a quench.

Superconducting coils are used in a variety of applications, for example as magnetic field generators in MRI (Magnetic Resonance Imaging) or NMR (nuclear magnetic resonance) equipment. Coils of superconducting wire are held at cryogenic temperatures, typically at about 4K, the temperature of boiling helium. So-called high-temperature superconductors still require cryogenic temperature of the order of 100K. An ever-present risk in the use of superconductive coils is the risk of a quench. For a reason such as a localised heating, the temperature of a region of the superconducting wire rises above its critical temperature. That region becomes resistive. The current flowing through the coil continues to flow through the resistive region, and heat is accordingly dissipated. This heat causes a larger region of the superconductor to become resistive, increasing the heat dissipated. Since the resistive region is initially small, the heat dissipation is concentrated in a small volume. The temperature of this small volume may accordingly rise to such a temperature that the superconductive coil is damaged. When a known MRI superconducting magnet quenches, an energy of the order of 8 MJ must be dissipated in a time period of 2-3 seconds.

It is known to avoid such damage by providing quench heaters. In response to a region becoming resistive, energy is diverted to electrical heaters placed adjacent to other regions of the superconductive coils. With one coil, or one part of a coil, in a quenched state then a resistive or inductive voltage is built up across each coil. This inductive or resistive voltage is applied to the heaters to induce a quench in the other coils. These heaters heat the corresponding parts of the superconductive coils above their critical temperature, and those regions also become resistive. The effect of this is that substantial regions of the coils become resistive, so that heat is dissipated over a much larger region of the coils, meaning that high temperatures are not reached, and the coils are not damaged. Typically, this is achieved by supplying the voltage developed across the first coil to quench to small foil heaters, such as NiCr alloy foil coils placed on each superconducting coil. These heaters may each supply approximately 2 W of heat power to the associated superconductive coil.

It is generally desired to minimise the amount of superconducting wire employed in the coils. This minimises the cost of the resultant system, and reduced the chances of a quench-inducing defect being present in the coil. The cross-sectional area of the wire may also be reduced in an attempt to save cost, weight and size of the resultant system. Such reduced area wires will be more susceptible to damage from overheating. However, if the heaters are capable of reacting very quickly to a quench, the coils may be placed in a resistive state quickly enough to avoid damage, even to superconducting wires of reduced cross-section.

FIG. 1 shows a circuit diagram of a known arrangement of quench heaters. A series connected set of superconducting coils 10 are individually labelled A to H. A power source 12 may be connected to the coils to supply a current. One end of the series connection of coils is grounded. Back-to-back diodes 14 and a superconducting cryogenic switch 18 are placed between the ends of the series connection of coils to provide a current path for current through the superconducting coils when the power source 12 is removed. An array of heaters 16 is provided. Although illustrated as separated away from the coils 10 for clarity, the heaters 16 would be arranged in close physical proximity with the coils 10.

All superconducting magnets which are operated in the so-called persistent mode have a cryogenic switch. Essentially, it is a piece of superconductor wire, in series with the magnet coils 10, with a heater attached to it. If the heater is on, the cryogenic switch 18 is normally conducting and is open. When the system is attached to an external power supply by leads 12, current will flow through the superconducting coils 10, with only a trickle running through the cryogenic switch 18. Once the magnet system has been 'ramped' to the required current, the heater is turned off, and the cryogenic switch 18 becomes superconducting: the cryogenic switch is closed. As the external power supply connected to leads 12 is ramped down, the current through the cryogenic switch 18 will increase by the same amount as the decrease in the current through the external power supply. Once the external power supply is ramped down completely, the current leads 12 may be removed, to limit heat leakage into the cryogenic magnet system.

The heaters 16 are shown in FIG. 1 as connected in two parallel branches, each branch including a series connection of heaters. Other connection arrangements of the heaters may of course be used, depending on factors such as the voltages developed across the coils during a quench, the current handling requirement of the heaters, and the resistance and power handling capacities of the heaters. From a consideration of this circuit arrangement, it is clear that the polarity of voltage V which is developed across the heaters in the case of a coil quench will depend on which coil quenches first. In the illustrated example, if one of coils A-D quenches first, then the voltage V will be negative with respect to the ground shown. On the other hand, if one of coils E-H quenches first, then the voltage V will be positive with respect to the ground shown. The heater arrangement must be capable of coping with either polarity of applied voltage V. The heaters are linked to the coils through a back-to-back arrangement of diodes 20 at one end. The superconducting coils 10 are shown in FIG. 1 as connected in series, with the heater arrangement connected between a ground terminal 22 and a point halfway along the series connection of coils. The ground terminal is also linked to one end of the series connection of the coils.

The back-to-back diode arrangement 20 connecting the heaters 16 to the coils 10 provides a threshold voltage which must be exceeded before any current flows through the heaters 16. This threshold voltage should be chosen such that current does not flow through the heaters during ramp up, that is, while current is being established in the superconducting coils, but such that the voltage drop across the diodes 20 is not so high that the effectiveness of the heaters will suffer during a quench. In current systems, the threshold voltage is in the order of 5-10V.

In known systems, the heaters 16 may each have a resistance of 120 Ohms. Typically, the heater may be required to provide a power of 2 W under a mean applied voltage of 15V. The heater arrangement 16 must be capable of withstanding the full quench voltage applied across it. This quench voltage may reach 5 kV, and the heaters must be capable of tolerating such voltage without burning out. In known systems, this limitation has been approached by adding more heaters in series. This introduces further problems in that the heaters each take longer to reach their 2 W power output. There will be an increased delay before the coils will be quenched by the heaters. During this delay, there is a risk of damage to the superconductive coil, since the quench will remain localised, and an excessive heat build-up may occur in that region.

The curve in FIG. 2 shows the development of V, the voltage across the heater circuit 16, with time following the start of a quench. The voltage V initially rises to a high value as the large currents circulating in the superconducting coil pass through the resistive, quenched, part of the coil. This causes heating of the superconductive coil, leading to greater resistance and greater dissipation of energy. The increasing voltage V eventually levels out to a maximum voltage Vmax, which may be of the order of 5 kV.

The voltage V reaches a peak value $V_{max}$ a certain time $t_{max}$ after the start of a quench. The time $t_{max}$ may be of the order of two seconds. The values $V_h$ of voltage are the minimum voltage required to heat the heaters sufficiently to cause quench in the heated coils. The voltage V exceeds $V_h$ between times $t_{h1}$ and $t_{h2}$. This time must be sufficiently long to ensure effective quench of the heated coils. The dissipation of energy within the coils continues, and the voltage V across the heaters falls. The heat dissipated by a heater is proportional to the square of the voltage across it.

One solution which has been proposed is to reduce the resistance of the heaters 16 so that the required heat dissipation may be reached more quickly. One disadvantage of this is that the heaters themselves may be damaged by the quenching voltage. In the arrangement illustrated in FIG. 1, a quench voltage of 5 kV may attempt to dissipate dissipate 3 kW in a 120Ω heater designed to dissipate a maximum of 400 W. This could damage the heaters.

The present invention accordingly provides apparatus as defined in the appended claims.

The above, and further, objects characteristics and advantages of the present application will become more apparent from consideration of the following description of certain embodiments, given by way of examples only, with reference to the accompanying drawings wherein.

Figure 3:
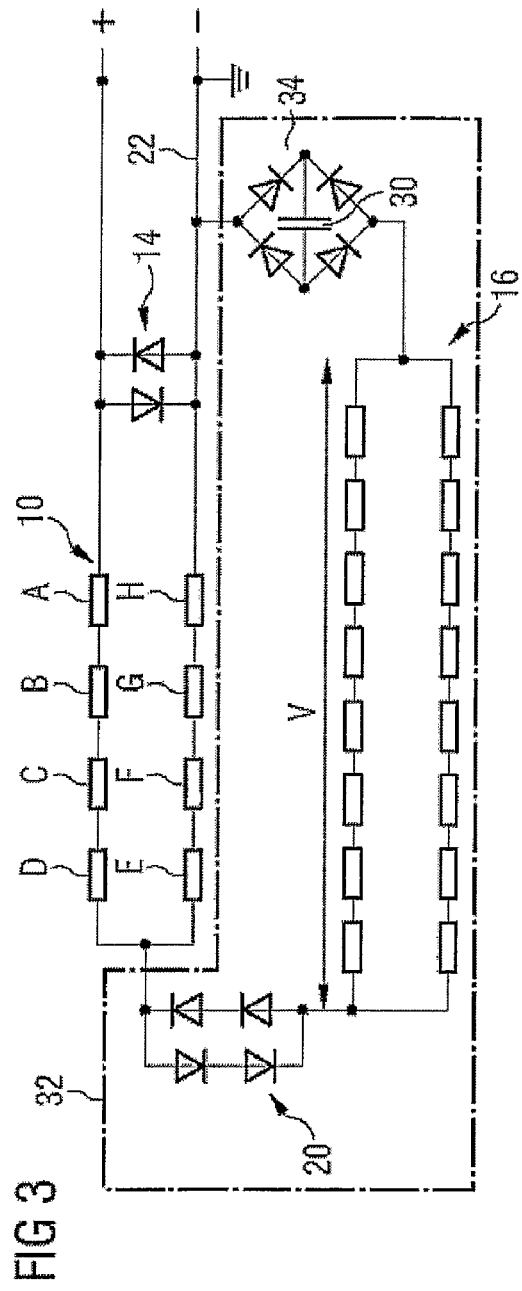
FIG. 3 shows a schematic diagram of an arrangement similar to that of FIG. 1, modified according to the present invention.

According to the present invention, the heaters 16 are capacitively coupled to the superconducting coils, rather than being DC coupled. FIG. 3 shows an example of a circuit according to an embodiment of the present invention, in which a capacitor 30 is placed in a diode bridge rectifier 34 linking the two intermediate nodes in place of the DC connection normally provided. This particular placement of the capacitor enables a polarised capacitor to be used, since the voltage on the capacitor will always be of a certain polarity. In other embodiments of the invention, a non-polarised capacitor is employed, and it may be placed at any position in series between the heaters and the coil, or ground, connections. In such embodiments, the bridge rectifier 34 is not required.

Figure 1:
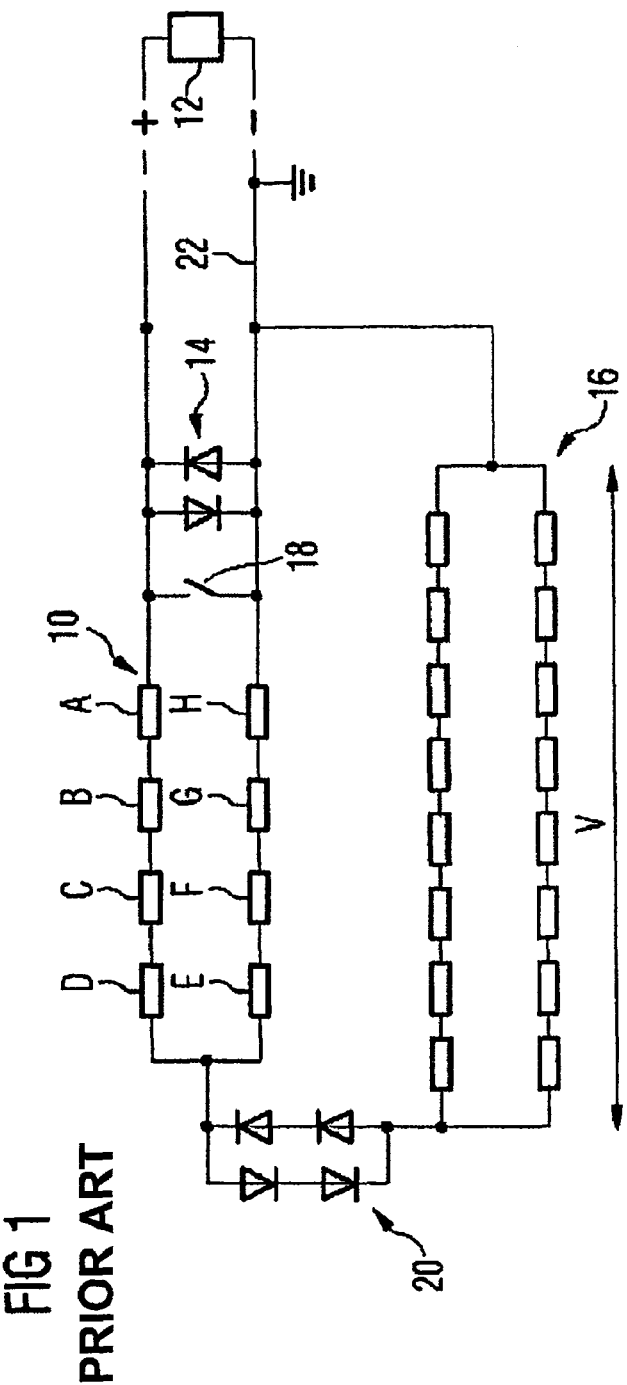
FIG. 1 shows a schematic diagram of superconducting coils equipped with quench heaters, according to the prior art.
Figure 2:
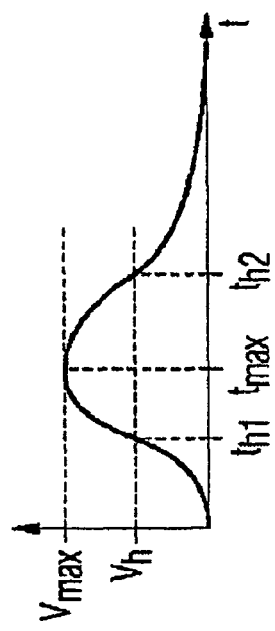
FIG. 2 shows the development of voltage across the heater circuit in the system of FIG. 1.
Figure 4:
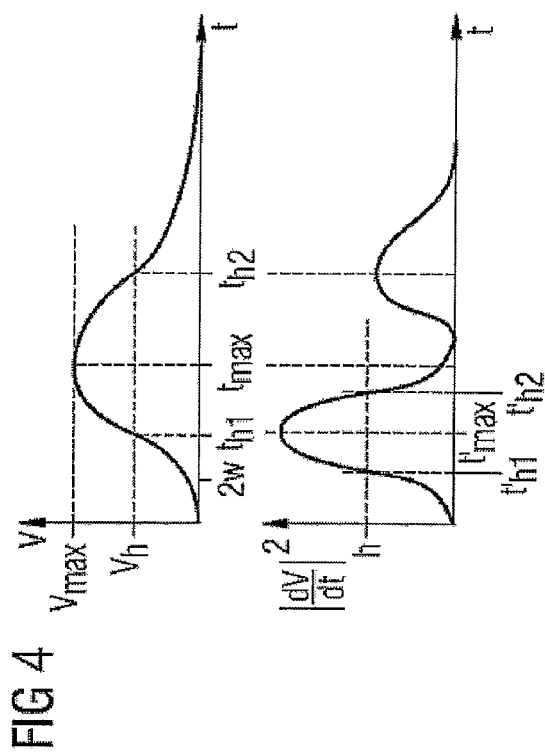
FIG. 4 shows the development of voltage across the heater circuit of FIG. 3, and the square of the time differential of that voltage.

FIG. 4 illustrates an advantage of capacitively coupling the heaters, according to the present invention. The upper curve in FIG. 4 shows the development of V, the voltage across the heater circuit 32, with time following the start of a quench. The voltage V initially rises to a high value as the large currents circulating in the superconducting coil pass through the resistive, quenched, part of the coil. This causes heating of the superconductive coil, leading to greater resistance and greater dissipation of energy. The increasing voltage V eventually levels out to a maximum voltage Vmax, which may be of the order of 5 kV. The dissipation of energy within the coils continues, and the voltage V across the heaters falls. The heat dissipated by a heater is proportional to the square of the voltage across it. The lower curve shows the development of the square of the rate of change of the voltage V with time t, $|dV/dt|^2$, with time t. Since, according to the present invention, the heaters are capacitively coupled to the coils, the power dissipated by each heater will be proportional to $|dV/dt|^2$. As shown in FIG. 4, $|dV/dt|^2$ reaches a peak value at time $t'_{max}$, which is rather sooner than the time tmax of the peak value of voltage V. The peak heating output from the heaters is accordingly reached at time $t'_{max}$. The fact that this occurs earlier than $t'_{max}$ in the case of DC coupled heaters (FIG. 2) means that the heaters can quench the associated coils correspondingly earlier, and so reduce the likelihood of damage to the superconducting coils. To induce a quench in a superconductive coil, it is typically sufficient to heat the coil at at least 2 W for 0.3 seconds. As illustrated by the curves in FIG. 4, heaters arranged according to the present invention reach this level of heating more rapidly than those of the prior art, leading to a more rapid quench.

In FIG. 4, h represents the minimum level of $|dV/dt|^2$ required to produce the heating required to quench the heated coils. Sufficient power is provided between time $t'_{h1}$ and $t'_{h2}$. The time period between points $t'_{h1}$ and $t'_{h2}$ must be sufficient to ensure an effective quench. According to a benefit of the present invention, the time $t'_{h1}$ occurs significantly earlier than the time $t'_{h1}$ in FIG. 2. The heated coils will be quenched sooner than in the known system, leading to reduced likelihood of damage to the superconductive coils.

The present invention allows all coils to be quenched sooner than with known arrangements which means that the required energy dissipation may be more effectively spread across all of the coils. This in turn means that each coil need only be designed to tolerate a reduced maximum energy dissipation. This allows thinner copper cladding to be provided around the superconducting conductor in each coil, in turn allowing for a cheaper, lighter and smaller magnet as a result.

The capacitor 30 used must be of a relatively high value, and be capable of withstanding relatively high voltages. For example, a capacitor of 47 μF capacitance with a voltage rating of 5 kV may be suitable. Certain types of film capacitor may be suitable to fulfill this role, and may tolerate operation at cryogenic temperatures. Electrolytic capacitors are available in appropriate capacitance and voltage ratings. However, such capacitors may be unsuited to being located inside the superconducting coil system, at cryogenic temperatures. An electrolytic capacitor may be provided for the purposes of the present invention on the outside of the superconducting coil system, but would require careful provision of a high voltage connecting cable, and steps would need to be taken to avoid disconnection of the high voltage connecting cable.

The value of the capacitor 30 can be selected to suit the heater resistances and the energy required to be dissipated. When the capacitor has fully charged, that is, once the quench voltage is at its peak, the dissipation of the heaters returns to zero. For a capacitor of 50 μF charged to 4 kV, the energy stored in the capacitor is $q=\frac{1}{2}CV^2$: $50\times10^{-6}\times2000^2=100J$.

The value of the capacitor should be selected to provide the required performance. A larger capacitance will allow greater energy storage, required for providing enough heat to quench the coils, while a smaller capacitance will provide the same peak power dissipation, but for a shorter time. This shorter time may be advantageous in preventing damage to the heaters.

The invention claimed is:

1. An assembly comprising:
   a number of superconductive coils,
   at least one quench heater arranged to heat the superconductive coil(s) in the event that at least part of at least one of the coils enters a quenched state;
   means for transferring energy from the coil(s) to the heater(s) in the event that at least part of at least one of the coils enters a quenched state;
   wherein the means for transferring energy from the coil(s) to the heater(s) includes a series capacitance, through which the energy transferred must pass.

2. An assembly according to claim 1 wherein a plurality of superconductive coils are connected in series, and the heater(s) is/are connected across a subset of the coils.

3. An assembly according to claim 2, wherein the heater(s) is/are connected across one half of the coils.

4. An assembly according to claim 1, wherein the heater(s) is/are connected to the superconductive coils through a bridge rectifier, and wherein the series capacitance is provided between intermediate nodes of the bridge rectifier in place of a DC connection.

* * * * *

UNITED STATES PATENT AND TRADEMARK OFFICE
CERTIFICATE OF CORRECTION

PATENT NO.        : 7,646,571 B2
APPLICATION NO. : 11/597755
DATED             : January 12, 2010
INVENTOR(S)      : Hugh Alexander Blakes It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 130 days.

Signed and Sealed this

Sixteenth Day of November, 2010

David J. Kappos
*Director of the United States Patent and Trademark Office*